Patented Mar. 2, 1948

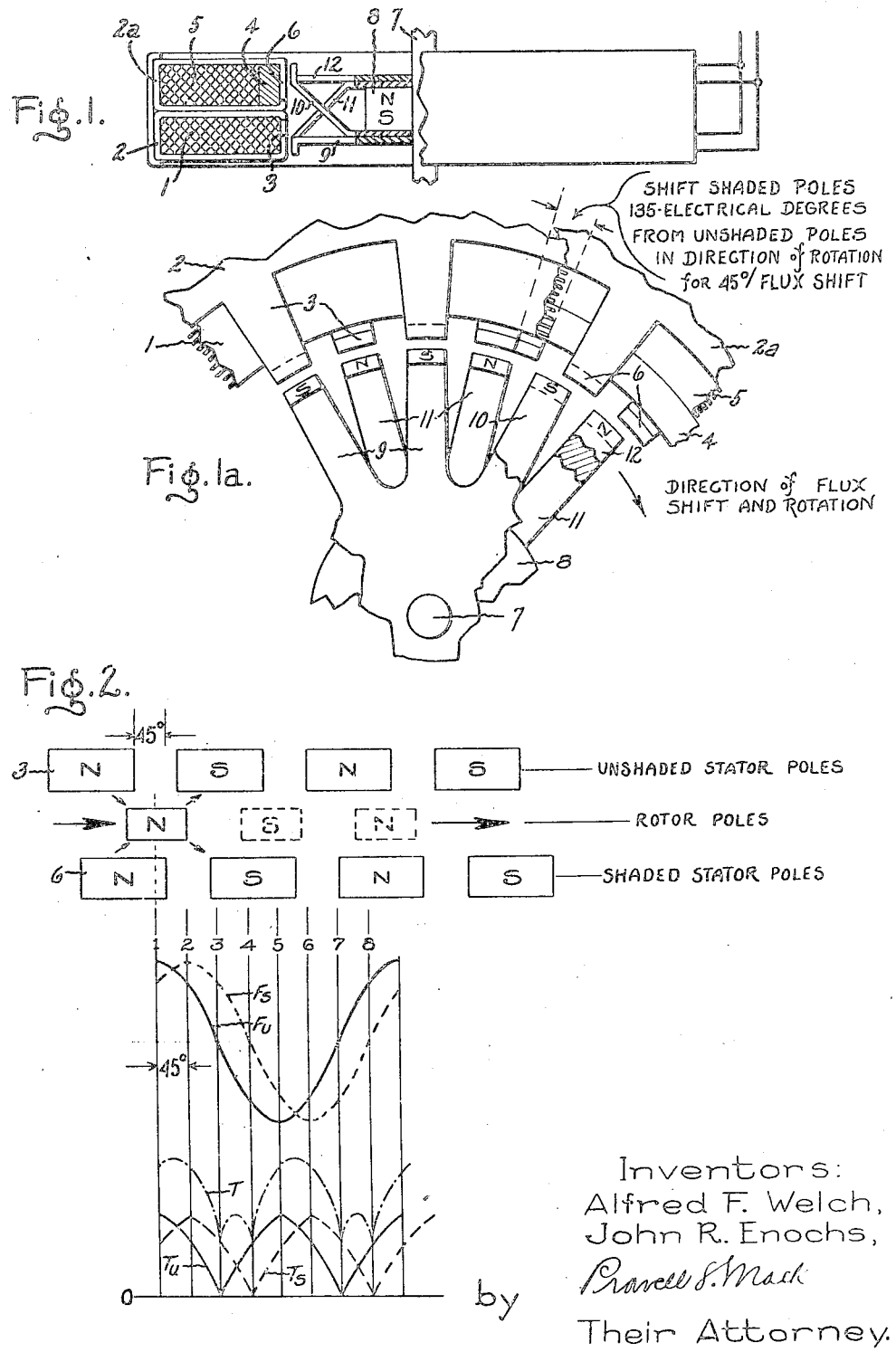

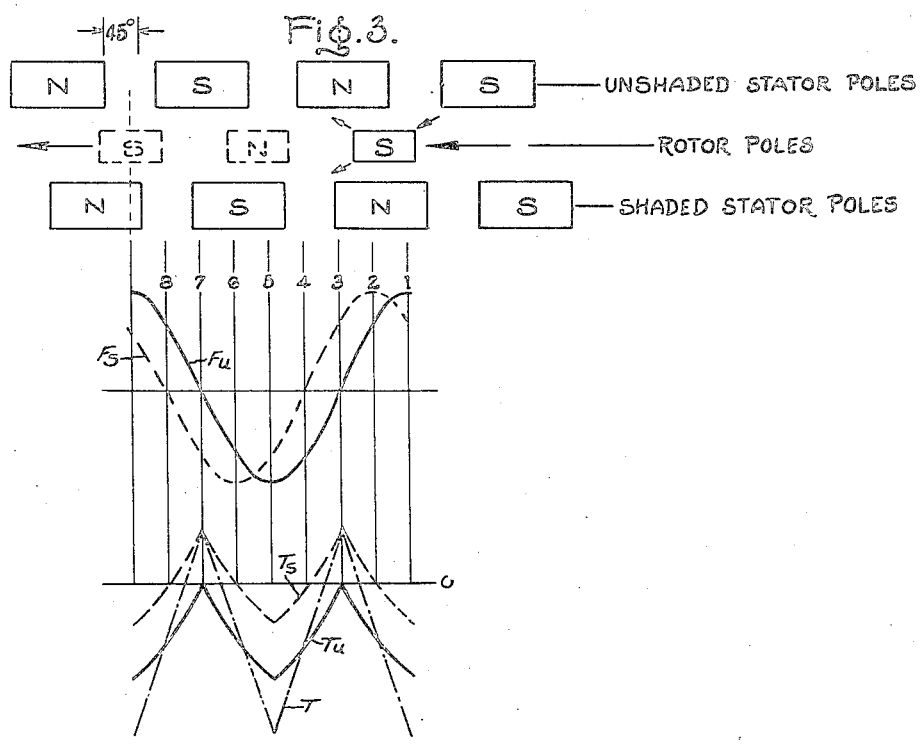
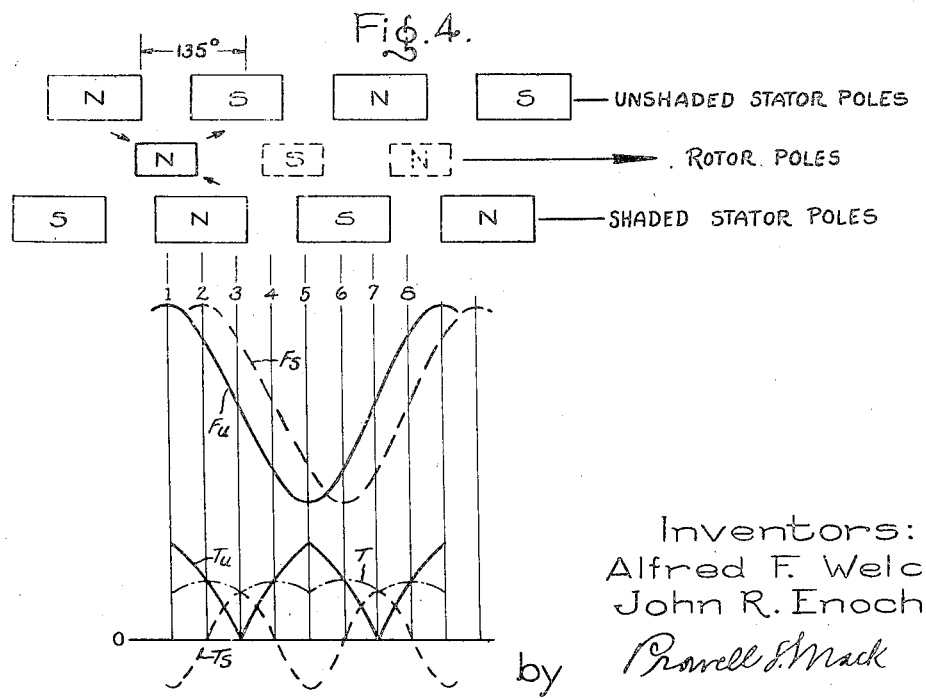

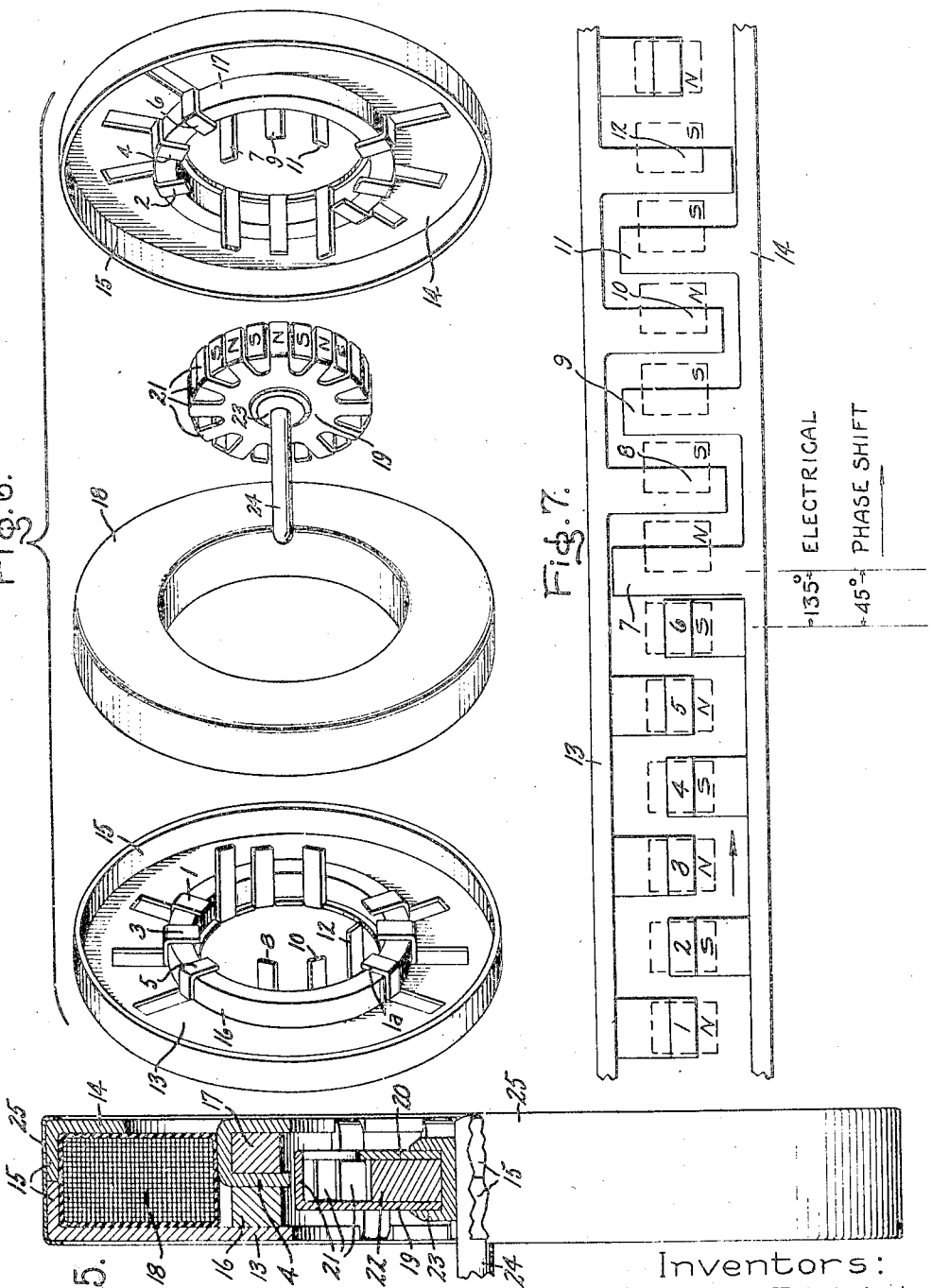

2,437,142

UNITED STATES PATENT OFFICE 2,437,142

SHADED-POLE SYNCHRONOUS MOTOR

Alfred F. Welch, Fort Wayne, Ind., and John R. Enochs, Framingham, Mass., assignors to General Electric Company, a corporation of New York Application June 11, 1946, Serial No. 675,864

11 Claims. (Cl. 172—275)

Our invention relates to alternating current synchronous motors, and its object is to provide a self-starting synchronous motor which will always start in a predetermined direction and which is low in cost, small in size, and high in starting and running torques, with a reasonably low running speed. While our invention is not limited to small size motors, it makes possible a superior timer motor; for example, a timer motor in the shape of a disk one-quarter inch thick and less than two inches in diameter having a synchronous speed of 300 revolutions per minute on 60 cycles, and with starting and running torques several times those existing in present-day clock motors. A low speed is desirable in order to reduce the amount of gear reduction needed for practical purposes and to reduce bearing and lubrication problems.

The motor of our invention has a salient pole revolving field member with alternate north and south poles magnetized by a permanent magnet. The stator is of the multipole, shaded pole type, but preferably with the shaded poles arranged in groups and the unshaded poles arranged in groups instead of the customary arrangement of having single shaded and unshaded poles spaced in alternating relation. By such an arrangement we are able to reduce and simplify the number of parts and in effect to reduce the number of stator pole magnetic poles to one-half of the rotor magnetic poles and still obtain the low synchronous speed corresponding to the rotor pole number. At the same time the sum of the shaded and unshaded salient stator pole teeth is equal to the rotor poles, and the stator tooth spacing is the same as the rotor tooth spacing over the stator pole tooth groups, so that there is a high utilization of the stator and rotor tooth space and flux at all times with resulting high torque. Certain structural features of the stator and rotor are believed to be novel and applicable to motors other than that described.

A novel arrangement is provided for equalizing the fluxes in the shaded and unshaded stator teeth and in obtaining a large, shaded pole angular flux shift having a novel angular relation with the electrical angle between shaded and unshaded stator teeth which we have found desirable for the type of motor described. Owing to the low speed and small inertia of the rotor and the high directional torque available, the motor starts by pulling into synchronous speed from rest so that no other starting torque, such as induction motor or hysteresis starting torque, is required.

The features of our invention which are believed to be novel and patentable will be pointed out in the claims appended hereto. For a better understanding of our invention reference is made in the following description to the accompanying drawing in which Fig. 1 represents a partially sectioned plan view and Fig. 1a a partial detail side view of a double-stator motor embodying our invention with respect to the most desirable angular spacing between the shaded and unshaded stator poles for a given shading flux angle, but mechanically is not the simplest arrangement, Fig. 2 is a development representation of stator and rotor poles of the two-stator motor of Fig. 1, but assuming a 45 electrical degree angular spacing between shaded and unshaded poles together with flux and torque curves corresponding to the rotor positions at eight successive instances of 45-degree displaced shaded and unshaded flux waves. Fig. 3 corresponds to Fig. 2 but assumes the motor to have been initially energized with the polarized rotor displaced 180 degrees from the starting position assumed in Fig. 2. Fig. 4 is a development representation of the two-stator motor of Fig. 1 of the same character as Fig. 2 but employing a 135 electrical degree angular spacing between shaded and unshaded poles and a 45-degree phase shift in accordance with our invention. Fig. 5 shows a sectional view of a preferred embodiment of our improved motor taken through a diameter thereof. Fig. 6 shows an exploded view of the several motor parts of the motor of Fig. 5; and Fig. 7 is a developed view of the stator and rotor tooth arrangement of the motor of Figs. 5 and 6, showing flux gap and tooth area relations for obtaining a large shaded pole flux and flux shift angle.

Referring to Figs. 1 and 1a, we have here represented a shaded pole synchronous motor built up of a single-phase, unshaded pole stator and a shaded pole stator, each cooperating with salient pole rotors polarized with a common permanent magnet, both motors arranged side by side in the same casing. The unshaded pole stator is energized by a washer shaped coil 1 coaxial with the motor axis of rotation and which is surrounded on its sides and outer surface by a magnetic shell 2. The inwardly projecting side walls of the shell 2 have alternating salient poles 3 formed therein and these are bent toward each other at the inner periphery of the coil 1 to form the evenly spaced group of poles of alternate polarity for this stator element. The other stator element is similar except that it includes a ring 4 of conducting material between the energizing coil 5 and stator pole pieces 6 within the magnetic shell 2a to shade the flux of such pole pieces. The rotor element consists of a shaft 7 on which are mounted a cylindrical permanent magnet 8, with its mechanical and polarized axis coaxial with the shaft 7, and four salient pole magnetic disks 9, 10, 11, and 12, disks 9 and 10 extending radially from the south end of the permanent magnet and disks 11 and 12 extending radially from the other or north end of the permanent magnet 8. Fig. 1a is a partial, detail, sectional side view looking at the bottom end of Fig. 1. It is seen that the outer ends of the salient poles in the peripheries of disks 9, 10, 11, and 12 are bent parallel to the shaft in two circles opposite the salient pole teeth of the two stator elements. The tooth sections of opposite magnetic polarity which are thus required to pass between each other in arriving at such formation pass each at an appreciable radius where there is ample clearance to avoid any substantial flux shunting of the permanent magnet. Thus, the alternate evenly spaced teeth in disks 9 and 11 form the north and south rotor poles for the pole group of the unshaded stator element, and the alternate evenly spaced teeth in disks 10 and 12 form the north and south rotor poles for the pole group of the shaded pole stator element. Thus, a single permanent magnet provides the permanent magnet excitation for both motor elements.

If the two stator coils are energized in series or parallel from the same single-phase source of supply and the shaded pole stator poles are displaced in the direction of flux shift relative to the unshaded poles by an amount corresponding approximately to the angle of flux shift, the motor if started will run satisfactorily as a shaded pole synchronous motor in the direction of flux shift. It has been generally believed that the best design of such a motor requires equal effective shaded and unshaded pole fluxes, a large flux shift, say 40 to 45 degrees, and displacement between the shaded and unshaded stator poles in the direction of flux shift through an electrical angle equal to the flux shift angle. Salient pole reluctance motors of this general character using a squirrel cage or induction starting element on the rotor are common. However, our rotor employs no squirrel cage or equivalent starting element, since it has only salient polarized magnetic poles operating with the stator poles. Hence, the starting of such a motor, if it be self-starting, can perhaps best be visualized by assuming that the motor jumps from a position of rest into synchronism with the rotating magnetic field within approximately one cycle. The chances of successful starting of such a motor are improved if the synchronous speed and the rotor inertia are kept as low as feasible. Hence, the motor of Figs. 1 and 2 to be discussed below will be assumed to be a 24-pole motor having a synchronous speed of 300 R. P. M. on 60 cycles with a low inertia rotor evident from the largely skeleton nature of its construction. When using the same or approximately the same electrical angle of displacement between the shaded and unshaded poles as the flux shift angle, we have found that the motor may not start or it may produce backward torque and reverse operation, depending upon the unpredictable position of such poles relative to the stator poles when the motor is initially energized. We have further discovered that such backward torque may be entirely eliminated, the motor made reliably self-starting and the efficiency and performance of the motor, both during starting and at synchronous speed, very greatly improved by increasing the angle of displacement between shaded and unshaded poles to 180 degrees less the angle of flux shift. Thus, with a motor having a 45-degree flux shift, we provide an electrical angle of 135 degrees between the shaded and unshaded stator poles, such angle extending in the same direction from the unshaded poles as the direction of flux shift and in the direction of motor rotation. It will be understood, of course, that instead of displacing the shaded and unshaded stator poles by the specified angle, they may be kept in line and the two sets of rotor poles on which they act displaced by the specified angle.

In a motor such as described, it is a simple matter to provide for equal effective shaded and unshaded pole fluxes, since the shaded pole energizing coil 5 may have as many more turns as compared to coil 1 as is necessary to accomplish this. Likewise, a flux shift of 45 degrees is readily obtained with the construction described. The displacement angle between the shaded and unshaded stator poles may be adjusted as desired by turning one stator relative to the other. Thus, the motor of Figs. 1 and 1a is assumed to have a 45-degree flux shift and a 135-electrical-degree displacement of the shaded poles from the unshaded poles of the same polarity in the direction of flux shift and motor rotation as indicated, and thus embodies our invention.

To more fully understand the reason for a 135-degree displacement, consider the following: The excitation of each single-phase motor element, coils 1 and 5 of Fig. 1, produces a pulsating stationary field which may be divided into constant opposed revolving fields. Due to the shading coil 4, the time at which the pulsating field of coil 5 reaches its maximum lags 45 degrees behind the time at which the pulsating field of coil 1 reaches its maximum so that in order to produce a unidirectional torque, it is necessary to displace the stator elements peripherally so that the forward torque components of the two elements will add vectorially to be greater than the vectorial sum of the backward torque components. It is desirable that the sum of the forward torque components be as high, and as uniform as possible, and that the vectorial sum of the backward torques be effectively zero for all possible starting positions of the polarized rotor, or that we arrive at the best compromise between these desirable conditions in order that the motor will always start in a given direction and yield a high synchronous torque output.

In the upper portion of Fig. 2 a schematic developed portion of the stator and rotor poles of the motor of Fig. 1 is represented but a 45-electrical-degree shift between the unshaded and shaded stator poles is assumed. Curves $F_u$ and $F_s$ represent equal values of unshaded and shaded pole flux displaced 45 degrees in the same direction as the pole shift, i. e. to the right. The lines numbered 1 to 8 represent eight successive positions of the rotor poles from left to right 45 electrical degrees apart. Assume that the motor is energized with center line of the north pole of the rotor in position 1 and with the values indicated of unshaded and shaded pole flux for such position. The rotor will be acted upon by such fluxes, and torques will be produced which are proportional to such fluxes. The torque produced by the unshaded pole flux may be represented by the value $T_u$ on the full line curve of the lower group of curves for such position, and the torque produced by the shaded pole flux by the dotted line curve $T_s$. It will be evident from the polarity of the stator and rotor poles that these torques will move the rotor to the right in the direction of the large arrow. Small arrows indicate the attraction and repulsion torques on the north rotor pole piece at the left shown in full lines. Similar torques will act on all rotor pole pieces. The center of the rotor pole piece shown in full lines is in position 1 and this pole piece is used as a reference for the other positions. If such rotor pole piece move to position 2 in synchronism with the shifting field, the unshaded pole flux and torque will have decreased and the shaded pole flux and torque increased as represented on the curves. In position 3 the unshaded pole flux is zero and its torque is zero, etc., so that the curves $T_u$ and $T_s$ represent the values of the torques through a complete cycle. The resultant torque acting on the rotor will be proportional to their sum or the dot-dash curve $T$. It is seen that if the rotor were in any one of the several positions indicated at the instant that the fluxes were of the polarity and values indicated, there would be no difficulty in always starting the rotor in the direction indicated.

Fig. 3 represents the same motor but with the rotor in positions 180 degrees from that assumed in Fig. 2. In Fig. 3 the successive rotor positions are numbered from right to left because that is the way the rotor will move under this condition. The direction and extent of flux shift are the same to the right, but the flux curves $F_u$ and $F_s$ are shown plotted with a time shift to the left so as to correspond to the successive rotor time positions. In plotting the corresponding torques, those which are to the left or against the direction of flux shift are plotted negative or below the zero torque line. In position 1 all torques are to the left; hence the rotor will move to the left. In position 2 we note that the south rotor pole arrives opposite the N shaded poles when the shaded pole flux is a maximum but the shaded pole torque is zero because the rotor poles are in a zero torque or neutral position with respect to the shaded pole flux. This did not occur in Fig. 2 because there the rotor poles arrived at zero torque positions when the corresponding flux was zero.

It is also seen that in Fig. 3 the shaded pole torque varies between a positive and negative direction for the different rotor positions, while the unshaded pole torque varies as in Fig. 2 but is in the reverse direction and its maximum and zero values occur simultaneously with the maximum minus and plus values of the shaded pole torque. The resultant torque $T$ in Fig. 3 thus reverses in direction but is predominantly negative or to the left.

From Figs. 2 and 3 it is therefore seen that such a motor cannot be depended upon to be self-starting in a given direction of rotation and that under certain conditions, it will not start in either direction because its torque is zero, four such conditions being represented in the torque curves of Fig. 3 where $T$ is zero.

In Fig. 4 there is a corresponding representation of the motor of Fig. 1 with a 135-degree electrical angle between the unshaded and shaded stator pole pieces assuming 45 degrees phase shift in the same direction to the right. With the rotor starting in position 1, the $T_u$ and $T_s$ torques are as represented for the several positions. While the shaded pole torque reverses in value, it is always positive when the unshaded pole torque is zero, so that the resultant torque $T$ is always positive and of a uniform, high value. In Fig. 4 assume the rotor to be 180 degrees from the position 1 represented at the instant of energization with the $F_u$ and $F_s$ fluxes for such rotor position. This can be visualized by merely assuming the rotor polarity to be reversed from that shown. Under such initial condition the $F_u$ flux tends to move the rotor to the left, and the $F_s$ flux tends to move it to the right. At first the $F_u$ flux predominates and the rotor may move slightly to the left but the $F_u$ flux is decreasing while the $F_s$ flux is increasing so that the rotor stops any movement to the left and within ½ cycle, during which the $F_u$ flux and torque reverse in direction, the rotor moves to the right, and the unidirectional synchronous torque conditions represented in Fig. 4 are established. In effect, the rotor hesitates for ½ cycle before launching itself into synchronism. This motor will therefore always be reliably self-starting in a given direction of rotation under all conditions. It has no effective negative resultant torque and has a powerful, substantially uniform, effective directional torque. In plotting the torque curves, the variation in torque, if any, due to the variation in distance between the stator and rotor poles has not been taken into consideration except for rotor pole positions which are neutral as when a negative rotor tooth is halfway between two positive stator poles or when a rotor pole is directly opposite a stator pole. Tests show that actual torques do not vary materially from the relationships represented in Figs. 2, 3, and 4.

The manner of minimizing the backward torque according to our invention consists in selecting flux shift and electrical displacement angles such that the two backward shaded and unshaded pole fields will be opposite and will therefore cancel. This can be expressed analytically as follows: Let the shaded and unshaded motor parts of Figs. 1a and 4 be designated as motors B and A, respectively. We may represent the unshaded flux of motor A along a given stationary pole as, $$\phi_A = \sin\theta \cos wt$$

which is equal to $$\tfrac{1}{2} \sin(\theta + wt) + \tfrac{1}{2} \sin(\theta - wt)$$

The flux of the B motor along the same pole axis (or 1 a multiple of 360° away) will be, $$\phi_B = \sin(\theta - x) \cos(wt - K)$$
$$= \tfrac{1}{2} \sin(\theta + wt - x - K)$$
$$+ \tfrac{1}{2} \sin(\theta - wt - x + K)$$

where $x$ = the angle of time lag due to the shading coils, and
$K$ = angle of forward displacement of the B poles, with respect to the A poles in the combined motor.

The sum of the forward components of the A and B fields will be equal to the sum of the terms above involving $\theta - wt$, and will, therefore, be proportional to, $$\cos\left(\frac{x-K}{2}\right)$$

The backward field will be equal to the sum of the terms involving $\theta + wt$, and will, therefore, be proportional to, $$\cos\left(\frac{x+K}{2}\right)$$

If $x$ equals 45, then $K$ should be 135° to make this equal to zero, as above indicated.

Theoretically $x$ may lie between 0 and 90 degrees but practically it will be between about 35 and 45 degrees, and the angle of spacing between the poles will be between about 145 and 135 degrees, depending on the frequency, power, and speed of the motor, and on the construction preferred by the designer.

Our invention is intended to cover any practicable arrangement in poles of alternate shaded and unshaded groups of one or more poles per group so arranged as to minimize the backward field in accordance with the above theory. 45 degrees flux shift is about the maximum one can obtain with shading coils.

A preferred mechanical embodiment of such a motor will now be described. Referring to Figs. 5 and 6, the entire stator framework, magnetic circuit, and pole piece assembly are made of two parts 13 and 14 stamped out of sheet magnetic material. These two parts have circular cupped outer rim sections 15 of equal depth which, when the parts are assembled, abut against each other. They may be secured together in any suitable way as by a spunover rim part 15.

The stator pole teeth are cut and bent out of the side walls of the parts 13 and 14, and the inner portion not needed for tooth material is discarded. In the example of the invention shown where the motor has the equivalent of twelve full stator and 24 rotor poles, there are 24 stator teeth, twelve integral with each stator plate. These teeth are formed from radial fingers cut out of the side walls, with one end left integral therewith and the free ends bent to the desired tooth position. In each plate these teeth are arranged in groups of three. Thus fingers 1, 3 and 5 on plate 13 are bent around the outside of a copper shading ring 16 and extend radially inward between shading rings 16 and 17 to present their end surfaces to the rotor air gap centrally between the plates 13 and 14. Fingers 2, 4 and 6 on plate 14 are similarly bent around a shading ring 17 and extend radially between the shading rings 16 and 17 to present their end surfaces to the rotor air gap centrally between the plates 13 and 14. When the plates are assembled, the finger or pole piece 2 of plate 14 is midway between pole pieces 1 and 3 of plate 13, and pole piece 4 is midway between pole pieces 3 and 5, etc., so that the six teeth or pole pieces 1, 2, 3, 4, 5 and 6 are thus assembled in the order named and form a group of evenly spaced unshaded poles of alternate polarity. Fingers 7, 9 and 11 from plate 14 and fingers 8, 10 and 12 from plate 13 are bent inwardly on the inside of shading rings 16 and 17 and present their broader side surfaces to the rotor air gap, finger 8 of plate 13 extending between fingers 7 and 9 of plate 14 etc., so that the six teeth 7, 8, 9, 10, 11 and 12 are assembled in the order named to form a group of evenly spaced shaded poles of alternate polarity.

The remaining twelve teeth are similarly assembled in similar groups of six unshaded and six shaded evenly spaced poles of alternate polarity at diametrically opposite portions of the stator from the groups first mentioned. Thus the two groups of unshaded pole pieces, the first group comprising poles 1 to 6, inclusive, are diametrically opposite each other, so that, as it will subsequently appear, the unshaded and shaded torque pulsations are evenly balanced on opposite sides of the rotor and do not tend to force the rotor sideways. Thus tooth 1a is diametrically opposite tooth 1 and is the beginning of the second group of unshaded pole pieces. It is further seen that the shading rings 16 and 17 are firmly grasped and held in place by the teeth when they are bent into their proper positions and require no other support.

The stator is energized by a single phase, doughnut-shaped coil 18 which fits inside the stator casing between the outer flanges 15 and the shading rings 16 and 17, and tends to send an alternating flux axially of the rotor through the intermeshed stator teeth and around the magnetic circuit formed by the side walls and outer flanges of the magnetic casing.

The stator thus comprises six simple, low cost, easily made and easily assembled parts comprising the two stampings 13 and 14, the two simple shading rings 16 and 17, the form wound coil 18 and the clamping ring 25.

The rotor comprises a pair of magnetic steel plates 19 and 20 with radial evenly spaced teeth 21 cut in their outer peripheries and bent at right angles toward each other in evenly spaced intermeshing relation with an axially magnetized permanent magnet 22 clamped between these plates at their centers by a magnetic bushing member 23 secured on a shaft 24, with all parts concentric thereto. The rotor thus has in the example given twenty-four evenly spaced magnetic poles of alternate polarity polarized by the permanent magnet as indicated by the polarity marks N and S on certain of the rotor teeth in Fig. 6. This lightweight, low inertia rotor may be assembled in place in the completed stator from either end and, when assembled, it is centrally located in the stator as represented in Fig. 5.

Fig. 7 represents a developed view of slightly more than one-half the stator and rotor pole pieces of the motor of Figs. 5 and 6.

The rotor teeth are indicated by dotted lines and the stator teeth by full lines. The unshaded stator pole teeth 1, 3, 5 and the shaded pole stator teeth 8, 10, and 12 extend from side plate 13, and hence, will be of one instantaneous polarity, while the unshaded stator pole teeth 2, 4 and 6 and the shaded stator pole teeth 7, 9 and 11 extend from side plate 14 and will be of the opposite instantaneous polarity. There will of course be a phase shift of the order of 45 degrees between the unshaded and shaded poles of each polarity. The center of shaded pole 7 is spaced (180—45) or about 135 electrical degrees from the center of unshaded pole 6 of the same polarity in the direction of rotor rotation and in the direction of the 45-degree phase shift between these poles. Since the unshaded stator poles are 180 electrical degrees apart and the shaded stator poles are 180 electrical degrees apart, and the rotor poles are spaced 180 electrical degrees apart, the equivalent 135-degree electrical displacement and 45-degree phase shift relation exists between all unshaded and shaded poles of the same polarity; or, stated in another way, shaded pole 8 is 135+180 electrical degrees from unshaded pole 6, shaded pole 9 is 135+360 electrical degrees from unshaded pole 6, etc. Hence, it is immaterial to the operation of the motor that the shaded and unshaded stator poles are in separate groups instead of alternating with one another as in the conventional shaded pole motor. This motor operates on the same theory as explained in connection with Fig. 4 but since it has only half as many stator and rotor poles, it will have half the torque for the same torque flux value per pole. The structural arrangement of Figs. 5 and 6 does greatly simplify the construction and reduces the number and cost of motor parts while giving ample torque. This motor has 12 unshaded stator poles, 12 shaded stator poles, and 24 rotor poles, and operates at 300 R. P. M. on 60 cycles.

It will be noted that the shaded pole pieces of the stator present a considerably greater area to the rotor teeth than do the unshaded stator pole pieces because the shaded pole pieces lie parallel to the rotor, whereas the unshaded pole pieces are radially disposed. This is beneficial in increasing the shaded pole flux and, in fact, can result in greater effective shaded pole flux than unshaded pole flux. To equalize these fluxes and also to obtain a large shading flux angle, some of the shaded pole flux is allowed to leak back to the stator field core without acting on the rotor. This is accomplished by extending a portion or all of the shaded pole teeth from the stator side plate with which they are integral to the vicinity of the other side plate. Thus, in Fig. 7, it will be noted that the shaded pole teeth 7 and 12 at the extremities of the shaded pole group shown are extended to touch the opposite side plate. The side plates 13 and 14 are of opposite magnetic polarity; hence, an adjustable amount of shaded pole flux from the stator may be shunted from the rotor by varying the contact area or magnitude of the air gap in case the parts do not touch. To aid in fixing the pole spacing between parts 13 and 14 the ends of teeth 7 and 12 may be welded to the parts 14 and 13 respectively.

So far as equality of effective flux distribution between the shaded pole teeth is concerned, it does not appear to make much difference if the leakage gap for all of these teeth is equal or not. Thus, the leakage flux paths at the ends of teeth 7 and 12 reduce the effective shaded pole flux of all of the teeth 7 to 12 about equally. This leakage flux is drawn through the shading coils and appears to increase the angle of lag of all of the shaded pole flux including that which acts on the rotor. Thus the shaded flux leakage expedient equalizes the effective shaded and unshaded fluxes and increases the angle of lag. The relation of the parts as illustrated and using a 0.008-inch rotor air gap has been found to produce substantially equal, effective shaded and unshaded pole fluxes and an angle of flux lag or phase shift of approximately 45 degrees. The best relation of parts will of course depend on a number of factors, such as the magnetic properties of the material used in the stator magnetic frame, the size and resistance of the shading rings, etc., but there is considerable range in proportioning the leakage flux gap to suit the requirements.

Our invention is not confined to a 45-degree phase shift and 135-electrical-degree spacing between shaded and unshaded poles. For instance, if only a 40-degree phase shift is obtainable, the spacing between shaded and unshaded poles to eliminate backward torque would be 140 degrees. In other words, the sum of the phase shift angle and the electrical spacing angle between shaded and unshaded poles should be 180. These examples give theoretically correct values but the invention is by no means confined to these theoretically correct or ideal values, because the invention is applicable to minimize the backward torque very materially when there is a substantial departure from the theoretically correct values. For example a synchronous inductor motor having a 45 degree flux shift and an electrically angular spacing between shaded and unshaded poles anywhere between 120 and 150 degrees would be vastly superior to one having a 45 degree flux shift and 45 degree electrical angle between shaded and unshaded poles.

What we claim as new and desire to secure by Letters Patent of the United States is:

1. An alternating current synchronous motor comprising cooperating stator and rotor members, the stator having a magnetic core structure presenting a plurality of spaced salient pole pieces to the rotor and alternating current exciting winding means for producing alternating fluxes of alternating polarity in said pole pieces, and means for causing the flux in half of the pole pieces to differ in time phase with respect to the flux in the remaining stator pole pieces in an amount between 35 to 45 degrees, the pole pieces in which the flux is thus shifted having positions equivalent to between 120 and 150 electrical degrees displacement from the remaining pole pieces of the same polarity measured in the direction of flux shift, the rotor comprising a magnetic structure presenting salient poles to the stator salient poles even in number and spaced according to the stator pole piece spacing, and having permanent magnet means for polarizing the rotor pole pieces at alternate polarity.

2. An alternating current synchronous motor comprising a stator member having a magnetic core structure presenting a plurality of spaced salient magnetic poles, alternating current exciting winding means for producing alternating fluxes of alternate polarity in said spaced pole pieces, means for shading the flux in half of the pole pieces relative to flux in the remaining pole pieces in an amount between 35 and 45 degrees, the shaded pole spacing being equivalent to 180 electrical degrees, the unshaded pole spacing being equivalent to 180 electrical degrees, and the displacement between shaded and unshaded poles of the same polarity being the equivalent of from 135 to 145 degrees measured in the direction of flux shift due to shading, the effective shaded and unshaded pole fluxes being substantially equal, and a rotor cooperating with said stator comprising a magnetic structure presenting evenly spaced salient poles to the stator salient poles and having permanent magnet means for polarizing the rotor pole pieces at alternate polarity, said rotor pole spacing corresponding to to the 180 electrical degree pole spacing of the stator.

3. An alternating current synchronous motor comprising cooperating stator and rotor members, said stator member comprising a magnetic structure presenting a plurality of spaced magnetic pole pieces to the rotor, winding means on the stator for producing alternating fluxes in said pole pieces, flux shading means on said stator for causing the flux in one-half of the pole pieces to be shifted by approximately 45 degrees from the flux in the remaining pole pieces, the shaded pole pieces and the unshaded pole pieces each having a spacing corresponding to 180 electrical degrees and with the pole pieces so spaced being of opposite magnetic polarity, said rotor comprising an unwound magnetic structure presenting a plurality of salient magnetic pole pieces to both the shaded and unshaded stator pole pieces spaced in accordance with the 180 electrical degree pole piece spacing of the stator, and permanent magnet means on the rotor for polarizing the 180 electrical degree spaced rotor pole pieces at opposite magnetic polarity, the relative stator and rotor pole piece arrangement being such as to produce the equivalent of approximately 135 electrical degrees spacing between shaded and unshaded pole pieces of the stator in the direction of flux shift due to shading.

4. An alternating current synchronous motor comprising cooperating stator and rotor members, the stator having a magnetic structure presenting a plurality of spaced salient magnetic pole pieces to the rotor, a single exciting winding on said stator, shading coil means on said stator for causing the flux in half of the pole pieces to be shifted relative to the flux in the remaining pole pieces by approximately 45 degrees, said pole pieces being arranged in circular formation with the shaded pole pieces in groups interspaced by groups of unshaded pole pieces, the shaded pole pieces having a spacing equivalent to 180 electrical degrees with the pole pieces so spaced of opposite magnetic polarity and the unshaded pole pieces having a spacing equivalent to 180 electrical degrees with the pole pieces so spaced of opposite magnetic polarity, the spacing between shaded and unshaded pole pieces being the equivalent of approximately 135 degrees in the direction of flux shift due to shading, said rotor having a plurality of evenly spaced salient poles equal to the number of shaded and unshaded stator pole pieces, and permanent magnet means for polarizing alternate rotor poles at opposite magnetic polarity.

5. An alternating current synchronous motor comprising cooperating stator and rotor members, the stator comprising a washer-shaped alternating current coil, a magnetic shell structure surrounding the outer periphery and sides of the coil and having a similar number of salient magnetic pole pieces in circular formation within the inner periphery of the coil extending from each side of the shell structure, a shading ring adjacent each such side wall with half of the pole pieces which extend from the corresponding side wall passing therethrough such that half of the pole pieces from each such side wall are shaded and the remainder unshaded, means for equalizing the effective shaded and unshaded pole flux and for obtaining flux shading of the order of 40 to 45 degrees, the unshaded poles being arranged in two equal circumferentially spaced groups with poles of opposite polarity alternating with each other and the shaded poles being arranged in two equal circumferentially spaced groups with poles of alternate polarity alternating with each other such that the circular pole formation comprises alternate groups of shaded and unshaded poles each group having poles of opposite polarity alternating with each other, the pole spacing in each group being 180 electrical degrees and the pole spacing between the unshaded and shaded pole groups being approximately the equivalent of 180 degrees less the angle of flux shift measured in the direction of flux shift between unshaded and shaded poles of like polarity, said rotor member comprising an unwound magnetic structure having the same number of salient magnetic poles as the stator, evenly spaced and corresponding to the 180 electrical degree stator pole spacing, alternate rotor poles being polarized at opposite magnetic polarity.

6. A stator structure for an alternating current shaded pole motor comprising a washer-shaped alternating current energizing coil, a magnetic shell structure embracing the outer periphery and side wall portions of said coil and having salient magnetic pole pieces extending from the side walls of said magnetic structure within the inner periphery of the coil and there arranged in circular spaced formation for cooperation with a rotor, a shading ring adjacent each such side wall within the coil and through which a portion of the pole pieces from the corresponding side wall extends for the purpose of shading the flux of such pole pieces relative to other pole pieces which do not pass through such shading rings, the shaded poles extending in an axial direction of the coil and shading rings in the circular formation and the unshaded poles extending radially to the circular pole formation whereby the shaded poles have a larger pole face area than the unshaded poles, and means for equalizing the effective flux between shaded and unshaded poles and producing a large shading pole flux shift comprising provisions for shunting a selected portion of the shaded pole flux from the shaded poles to the opposite side walls of the magnetic shell structure which side walls are at opposite magnetic polarity to such shaded poles.

7. A rotor structure for synchronous motors comprising a cylindrical permanent magnet having its axis coincident with the axis of rotation of the rotor and polarized along said axis, a pair of magnetic disk members extending radially from each end of said magnet, said disk members having radial slits therein so as to divide their peripheries into polar salient sections, the polar salient sections of one disk from each end of the magnet being bent into a circular formation of evenly spaced pole pieces of opposite magnetic polarity at one end of the rotor and the polar salient sections of the remaining disk from each end of the rotor being bent into another circular formation of evenly spaced pole pieces of opposite magnetic polarity at the other end of the rotor, the sections of opposite magnetic polarity which are thus required to pass each other in arriving at such formation interleaving with each other with sufficient clearance as to avoid any substantial shunting of the permanent magnet.

8. An alternating current motor combination comprising two single phase stator elements arranged side by side in coaxial relation and each presenting a circular series of alternate magnetic pole faces facing radially inward, rotor means cooperating with both stator elements comprising a single permanent magnet having its mechanical, rotary and polarized axis coinciding with the axes of said stator elements, a pair of toothed magnetic disks extending radially from either end of said permanent magnet, the teeth from the outer disk at one end and the inner disk at the other end of the rotor being bent into a circular formation of evenly spaced pole pieces of opposite magnetic polarity so as to form the rotor for and cooperate with one of said stator elements, and the teeth from the remaining two disks being bent into a circular formation of evenly spaced pole pieces of opposite magnetic polarity so as to form the rotor for and cooperate with said other stator element, the teeth from the inner disks passing between each other with sufficient clearance to avoid serious shunting of the permanent magnet.

9. A unidirectional, self-starting, synchronous motor having no backward torque in any rotor position under any condition comprising a stator having unshaded salient poles for producing poles of opposite magnetic polarity at points spaced 180 electrical degrees from each other and shaded salient poles for producing poles of opposite magnetic polarity at points spaced 180 electrical degrees from each other, the shaded poles being of equal effective strength to and having a flux lag of $\phi$ degrees behind the unshaded pole fluxes of corresponding polarity, the shaded salient poles being spaced at points substantially $180-\phi$ electrical degrees or the equivalent from the unshaded poles of like polarity in the direction of flux shift due to shading and a polarized, unwound rotor having a plurality of salient magnetic poles of alternate polarity having a spacing corresponding to the 180 degree electrical spacing of the stator.

10. A shaded pole stator member having the same number of shaded and unshaded salient magnetic poles, alternating current exciting winding means for producing fluxes in said poles, the unshaded poles being arranged in circumferentially spaced groups and the shaded poles being arranged in an equal number of circumferentially spaced groups, the number of poles in each group being equal, said groups of pole pieces being arranged in circular formation forming a circle of pole pieces with the shaded pole groups between and alternating with the unshaded pole groups, the pole pieces in each such group being evenly spaced and alternating in polarity and the shaded poles being spaced from the unshaded poles to obtain the equivalent of a desired electrical displacement angle between shaded and unshaded poles.

11. An alternating synchronous current motor comprising a stator having a plurality of salient magnet pole pieces, alternating current exciting winding means on the stator for producing alternating fluxes in said pole pieces, half the pole pieces being of one polarity when the other half is of the opposite polarity, means whereby the fluxes in one-half the pole pieces lag behind the fluxes in the other half of the pole pieces of the same polarity by an angle of the order of 45 degrees, a rotor having the same number of salient magnetic poles as the stator, said rotor pole pieces being polarized to produce half north and half south salient rotor poles, the pole piece spacing in stator and rotor being such that when operating at synchronous speed the rotor in one position has its pole pieces aligned with the stator pole pieces of opposite magnetic polarity which do not have the flux lag and when the rotor is turned by an amount corresponding to approximately 135 electrical degrees in the direction of stator flux lag its pole pieces are aligned with stator pole pieces of the opposite magnetic polarity which do have the flux lag.

ALFRED F. WELCH.
JOHN R. ENOCHS.